(12) United States Patent
Walther et al.

(10) Patent No.: US 11,874,367 B2
(45) Date of Patent: Jan. 16, 2024

(54) METHOD FOR ASCERTAINING A PLANT HEIGHT OF FIELD CROPS

(71) Applicant: Robert Bosch GmbH, Stuttgart (DE)

(72) Inventors: Roman Walther, Ludwigsburg (DE); Stefan Aniol, Heilbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 709 days.

(21) Appl. No.: 16/979,092

(22) PCT Filed: Mar. 4, 2019

(86) PCT No.: PCT/EP2019/055323
§ 371 (c)(1),
(2) Date: Sep. 8, 2020

(87) PCT Pub. No.: WO2019/179756
PCT Pub. Date: Sep. 26, 2019

(65) Prior Publication Data
US 2021/0055099 A1 Feb. 25, 2021

(30) Foreign Application Priority Data
Mar. 21, 2018 (DE) .................. 102018204301.9

(51) Int. Cl.
*G01S 13/88* (2006.01)
*A01D 75/00* (2006.01)
*G01S 13/06* (2006.01)
*G01S 13/58* (2006.01)
*A01D 41/127* (2006.01)

(52) U.S. Cl.
CPC .............. *G01S 13/88* (2013.01); *A01D 75/00* (2013.01); *G01S 13/06* (2013.01); *G01S 13/58* (2013.01); *A01D 41/127* (2013.01)

(58) Field of Classification Search
CPC ...... A01D 75/00; A01D 41/127; G01S 13/88; G01S 13/06; G01S 13/58
See application file for complete search history.

(56) References Cited

U.S. PATENT DOCUMENTS 7,786,926 B2 * 8/2010 Hilsebecher .......... G01S 13/584
342/72
9,585,309 B2 3/2017 Posselius et al.
(Continued)

FOREIGN PATENT DOCUMENTS

BE 1024471 B1 2/2018
CA 2060791 A1 8/1992
(Continued)

OTHER PUBLICATIONS

Paul and Speckmann: "Radar Sensors: emerging techologies for p[recision farming", [Radarsensoren: neue Technologien zur präzisen Bestandsführung], in Landbauforschung Völkenrode, 54(2), (2004), pp. 87-102.
(Continued)

*Primary Examiner* — Bernarr E Gregory
*Assistant Examiner* — Hailey R Le
(74) *Attorney, Agent, or Firm* — NORTON ROSE FULBRIGHT US LLP; Gerard A. Messina

(57) ABSTRACT

A method for ascertaining a plant height of field crops. The ascertainment of the plant height taking place with the aid of a signal of a radar sensor.

6 Claims, 2 Drawing Sheets

(56) References Cited

U.S. PATENT DOCUMENTS

| | | | | |
|---|---|---|---|---|
| 2014/0338298 A1* | 11/2014 | Jung | ............... | A01D 41/1274 56/10.2 R |
| 2016/0082971 A1* | 3/2016 | Fuehrer | ............... | B60W 50/14 701/48 |
| 2017/0205506 A1* | 7/2017 | Voorheis | ............... | G01S 13/66 |
| 2017/0251589 A1* | 9/2017 | Tippery | ............... | A01B 51/02 |

FOREIGN PATENT DOCUMENTS

| | | | | |
|---|---|---|---|---|
| CN | 2736784 Y | 10/2005 | | |
| CN | 103197311 A | 7/2013 | | |
| CN | 105203017 A | 12/2015 | | |
| DE | 10214648 A1 | 10/2003 | | |
| DE | 102011017621 A1 | 10/2012 | | |
| DE | 102013019803 A1 * | 5/2015 | ........... | G01S 13/343 |
| DE | 102013019803 A1 | 5/2015 | | |
| DE | 102016116808 A1 | 3/2018 | | |

OTHER PUBLICATIONS

International Search Report dated Jul. 5, 2019 for PCT/EP2019/055323.

* cited by examiner

METHOD FOR ASCERTAINING A PLANT HEIGHT OF FIELD CROPS

BACKGROUND INFORMATION

In some agricultural machines, for example combines and other harvesters, the plant height of the field crops to be harvested represents an input variable for operating the agricultural machine. For example, components or add-on parts of the agricultural machine which process the harvested field crops are pilot-controlled or set as a function of the plant height of the field crops. A setting or pilot control of this type takes place in the related art by a manual setting of the agricultural machine by an operator, for example in that the operator fittingly adjusts a mower of a harvesting machine to the plant height of the field crops. The plant height of the field crops also represents an input variable for setting a treatment device, for example a spraying device.

Radar sensors for a wide range of applications are available in the related art.

SUMMARY

An example method according to the present invention for ascertaining a plant height of field crops may have the advantage that the ascertainment of the plant height takes place with the aid of a signal of a radar sensor. The ascertainment of the plant height may thus take place in an automated manner, so that an automated setting or pilot control of components or add-on parts of an agricultural machine is also made possible. It is further advantageous that the use of a radar sensor permits an ascertainment even in darkness or poor visibility. A field crop is understood to be plants which are usually grown in monoculture in a crop area. In particular, the method according to the present invention relates to field crops which are harvested in that the field crops are cut just above a ground of the crop area. Field crops of this type may be, in particular, grain, corn or sugarcane. Plant height means an average growth height of the field crops on a given surface section of the crop area.

Advantageous embodiments are described herein.

In accordance with an example embodiment of the present invention, it is advantageous that the ascertainment of the plant height includes a categorization of reflection objects as plant objects or ground objects. A reflection object is understood to be any object which reflects a radar echo detectable by the radar sensor. Ground objects are thus areas of the ground of the crop area visible to the radar sensor. Plant objects are radar reflections which may be assigned to the field crops growing in the crop area. The categorization of reflection object as plant objects and ground object offers the advantage, in particular, that only the plant objects need to be considered for determining the plant height, which improves the quality of the plant height determination and reduces the calculation time for determining the plant height.

In accordance with an example embodiment of the present invention, it is advantageous that a distance between the radar sensor and the reflection objects as well as a relative speed between the reflection objects and the radar sensor are ascertained to categorize the reflection objects. The fact that the radar reflections induced by the plant objects and the radar reflections induced by the ground objects usually have a different geometric origin may thus be advantageously utilized. A categorization based on relative speed and distance also makes it possible to eliminate the determination of an angle of the reflection objects.

In accordance with an example embodiment of the present invention, it is advantageous that the plant height is ascertained in that an extrapolation of a plant object curve is carried out, the plant object curve being ascertained based on the distances between the radar sensor and the plant objects. In one advantageous embodiment, the plant object curve is additionally ascertained based on the relative speeds between the radar sensor and the plant objects. In one particularly advantageous embodiment, the plant object curve is a curve in a two-dimensional diagram, whose axes are defined by the distance between the radar sensor and the plant objects as well as by the relative speed between the radar sensor and the plant objects. The plant object curve is a curve which designates a characteristic correlation between the distance and the relative speed within the two-dimensional diagram.

In accordance with an example embodiment of the present invention, it is advantageous that the plant object curve is extrapolated to a range which corresponds to a relative speed of 0 between the plant objects and the radar sensor. If the radar sensor is mounted on a moving agricultural machine above the field crops, only the reflection objects located directly below the radar sensor have a relative speed of zero. A plant object curve which illustrates the correlation between the distance and the relative speed thus supplies information about the plant height below a radar sensor mounted on an agricultural machine in the range of a relative speed of zero. Since the plant height is obtained from an extrapolation of the plant object curve, information of reflection objects, which are not situated directly below the radar sensor but are in an area ahead of the agricultural machine, are, however, also incorporated into the determination of the plant height. The determination of the plant height is thus significantly more robust than a determination of a plant height which would be based only on radar-based measurements of a downwardly directed radar sensor. It is also advantageous that a plant height determination is thus made possible even of field crops which yield reliable radar echoes only with little probability. A further advantage is that a change in the plant height of the field crops may thus be detected at an early point, which permits a timely pilot control of a frequently slow add-on part of the agricultural machine.

In accordance with an example embodiment of the present invention, it is advantageous that the categorization of reflection objects as plant objects or ground objects takes place using training data. Training data may be data of earlier implementations of the method according to the present invention, which were additionally verified, for example by supplementary measurements or methods. In an alternative embodiment, the training data are data which were obtained with the aid of self-learning algorithms, for example neural networks.

In accordance with an example embodiment of the present invention, it is advantageous that the ascertainment of the plant height takes place with the aid of the signal of a radar sensor, the radar sensor being situated on an agricultural machine above a maximum plant height. The maximum plant height designates a maximum growth height, which is assigned to the field crops whose plant height is to be ascertained. In the case of a field crop which typically does not exceed a growth height of 1.5 meters, the maximum plant height thus corresponds to 1.5 meters, so that, within the scope of this advantageous embodiment, the radar sensor may be situated on the agricultural machine, for example, at a height of 2 meters.

In accordance with an example embodiment of the present invention, a device is also advantageous, which is configured to carry out each step of the method according to the present invention.

In accordance with an example embodiment of the present invention, a computer program is advantageous, which prompts a control unit to carry out each step of the method according to the present invention when the computer program runs on the control unit. A memory medium is further advantageous, on which the computer program according to the present invention is stored.

One exemplary embodiment of the present invention is explained in greater detail below on the basis of the figures.

DETAILED DESCRIPTION OF EXAMPLE EMBODIMENTS

Figure 1:
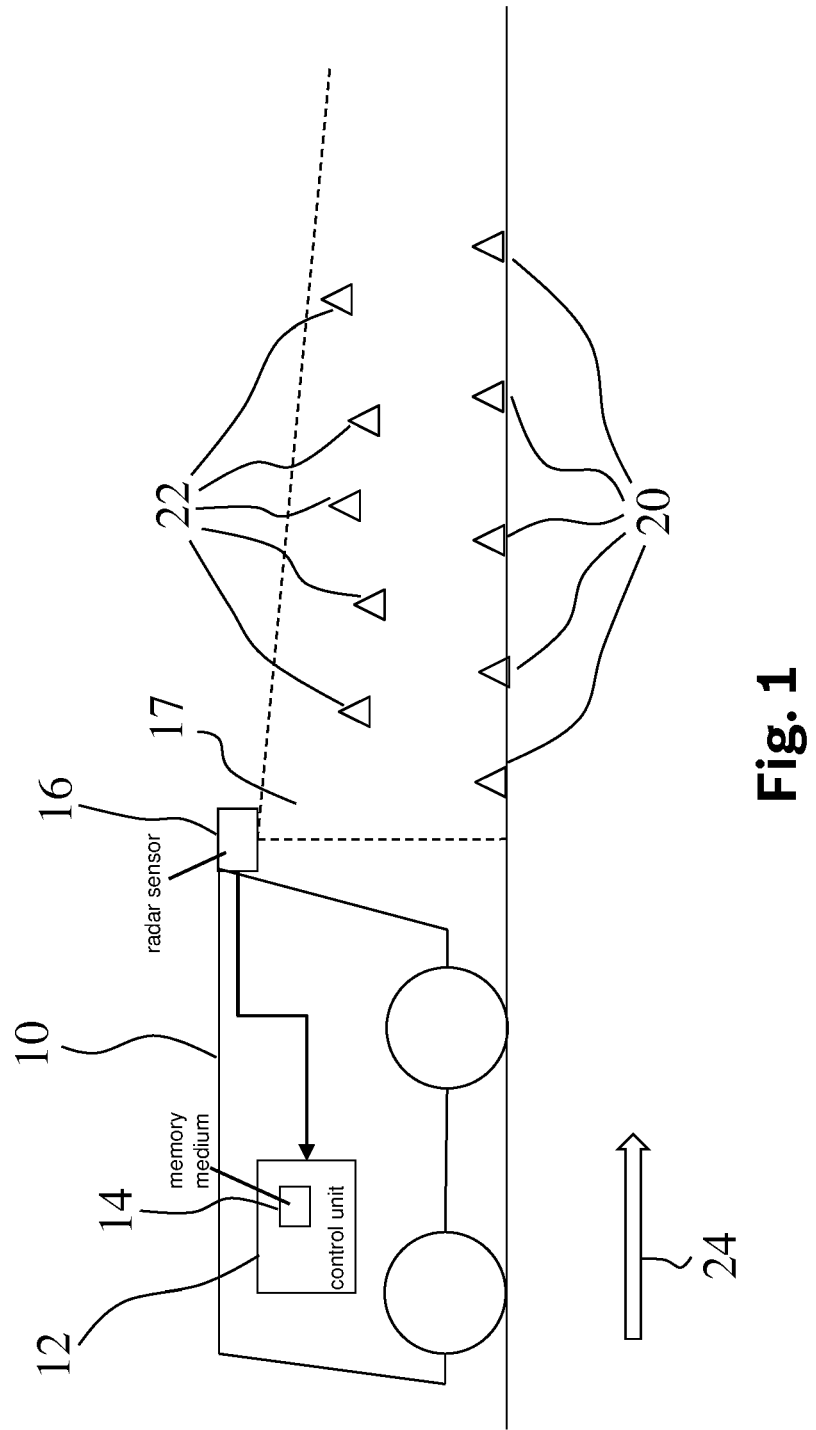
FIG. 1 shows a schematic representation of an agricultural machine, which includes a device configured to carry out the exemplary embodiment of the method according to the present invention.

FIG. 1 shows a schematic representation of an agricultural machine 10, which may be a harvesting machine, in particular, a combine. Agricultural machine 10 includes a device, which is configured to carry out an exemplary embodiment of the method according to the present invention. Agricultural machine 10 includes a radar sensor 16, which is situated on a front side of agricultural machine 10 in such a way that it is situated above a maximum plant height of field crops whose plant height is to be determined with the aid of the method according to the present invention. In the case of field crops which typically reach growth heights of 1.5 meters, radar sensor 16 is therefore mounted on agricultural machine 10 above a height of 1.5 meters. For example, radar sensor 16 may be mounted on agricultural machine 10 at a height of 2 meters. Agricultural machine 10 includes a control unit 12, which, in turn, includes a memory medium 14. Control unit 12 and radar sensor 16 are connected via a signal line.

Radar sensor 16 is situated on agricultural machine 10 in such a way that a viewing angle 17 of radar sensor 16 covers an area which permits a view of radar sensor 16 perpendicularly downwardly as well as ahead of agricultural machine 10. For example, the viewing angle may be 82°. During an operation of radar sensor 16, the latter detects different reflection objects 20, 22. FIG. 1 schematically shows that reflection objects 20, 22 are sections of the ground of a crop area, so that the reflection objects induced by the sections of the ground of the crop area are designated ground objects 20, and that the reflection objects may be parts of the field crops, so that these reflection objects are designated plant objects 22. The plant objects may be, in particular, the tips of the field crops as well as other plant parts which are suitable for effectuating radar echoes.

In the example illustrated in FIG. 1, it is assumed that agricultural machine 10 is in motion. This movement is indicated by a speed vector 24 of the agricultural machine.

Figure 2:
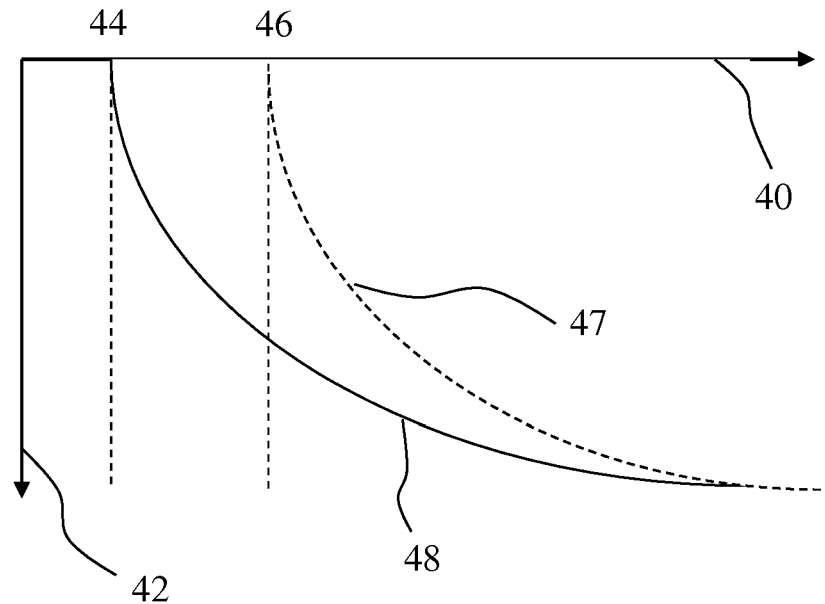
FIG. 2 shows an exemplary representation of a plant object curve and a ground object curve in a distance/relative speed diagram.

FIG. 2 shows a schematic profile of a plant object curve 48 and a ground object curve 47 in a two-dimensional diagram, whose first axis 40 designates a distance between radar sensor 16 and reflection objects 20, 22, and whose second axis 4 designates a relative speed between radar sensor 16 and reflection objects 20, 22. A distance from radar sensor 16 as well as a relative speed between reflection objects 20, 22 and radar sensor 16 may be ascertained for each reflection object 20, 22 with the aid of radar sensor 16. In accordance with these two ascertained variables, an entry is made in the diagram illustrated in FIG. 2.

According to the present invention, it has been recognized that the entries in the diagram illustrated in FIG. 2 are not uniformly distributed but are divided into two distinguishable areas. The first of these distinguishable areas forms the area of ground objects 20, and the second area forms the area of plant objects 22. Due to suitable mathematical methods, such as a fit, a ground object curve 47 and a plant object curve 48 may be ascertained, based on the two separate areas. In one particularly advantageous embodiment, the circumstance is taken into account that a height of ground objects of an essentially flat crop area fluctuates only in a magnitude of +/−10 cm. In one particularly advantageous embodiment, it is also taken into account that reflections induced by plant objects 22 are possible only up to a maximum growth height of the field crops. The reflections of plant objects 22 result from a height range, which extends from the ground up to a maximum growth height of the field crop. Correspondingly, the reflections which are presumably close to a maximum growth height in the field crop are advantageously more heavily weighted in the ascertainment of the plant object curve.

An intersection point 46 between ground object curve 47 and first axis 40 corresponds to a mounting height of radar sensor 16 above the ground. Intersection point 46 between ground object curve 47 and first axis 40 is ascertained, for example, with the aid of an extrapolation of ground object curve 47. An intersection point 44 between plant object curve 48 and first axis 40 corresponds to a distance between radar sensor 16 and the plant height of the field crops to be ascertained. Intersection point 44 between plant object curve 48 and first axis 40 may also be advantageously ascertained by an extrapolation of plant object curve 48.

Figure 3:
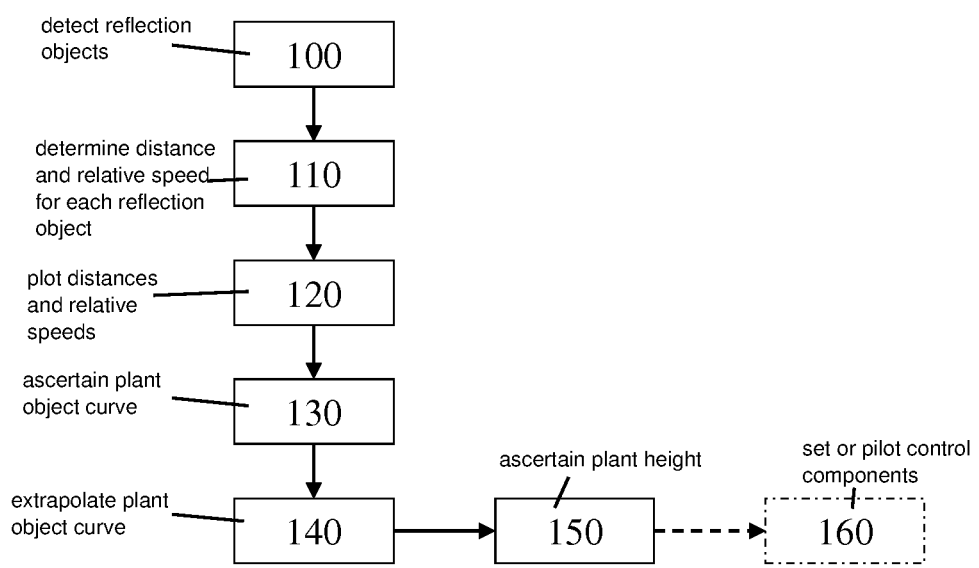
FIG. 3 shows an exemplary representation of a sequence of the method according to the present invention.

FIG. 3 shows a schematic sequence of one exemplary embodiment of the method according to the present invention. The exemplary embodiment of the method according to the present invention starts in step 100. Reflection objects 20, 22 are detected with the aid of radar sensor 16 in step 100. Step 110 is carried out after step 100.

In step 110, a distance between the reflection object and radar sensor 16 as well as a relative speed between radar sensor 16 and the reflection object are determined for each reflection object 20, 22, based on the data ascertained in step 100. Step 120 is subsequently carried out.

In step 120, the distances and relative speeds ascertained in step 110 are plotted in a coordinate system, which may be, for example, the coordinate system illustrated in FIG. 2. Step 130 is subsequently carried out.

A plant object curve 48 is ascertained in step 130. This advantageously takes place by a fit. In an alternative embodiment, a ground object curve 4 is also ascertained in step 130. Step 140 is carried out after step 130.

In step 140, the plant object curve ascertained in step 130 is extrapolated to a range corresponding to a relative speed of zero between radar sensor 16 and plant objects 22. This area is characterized by an intersection point 44 between plant object curve 48 and first axis 40 of the diagram illustrated in FIG. 2. Step 150 is carried out after step 140.

In step 150, the plant height of the field crops is ascertained and output, based on the extrapolation carried out in step 140. In an optional refinement of the method according to the present invention, step 160 may follow step 150.

In step 160, the ascertained plant height is used to set or pilot-control components or add-on parts of agricultural machine 10 used to harvest the field crops, according to the ascertained plant height.

The described exemplary embodiment of the method according to the present invention is completed cyclically, so that an up-to-date plant height of the field crops is ascertained at all times.

The described exemplary embodiment of the method according to the present invention provides the great advantage that the plant height of the field crops is ascertained for an area directly below radar sensor 16, this ascertainment, however, taking into account information of plant objects 22 situated in an area of agricultural machine 10. The area ahead of agricultural machine 10, within which plant objects 22 are taken into account, may include, for example, an area of 10 meters ahead of agricultural machine 10. It is thus possible to determine the plant height of the field crops below radar sensor 16 with a much higher precision than would be possible without taking into account further plant objects 22 in an area ahead of agricultural machine 10. The described exemplary embodiment of the method according to the present invention may thus also be applied to field crops which effectuate few radio echoes.

What is claimed is:

1. A method for ascertaining a plant height of field crops, the method comprising:
   ascertaining, using a plant object curve, the plant height using a signal of a radar sensor;
   wherein the ascertainment of the plant height includes categorizing reflection objects as plant objects or ground objects,
   wherein a distance between the radar sensor and the reflection objects and a relative speed between the reflection objects and the radar sensor are ascertained to categorize the reflection objects,
   wherein the plant height is ascertained in that an extrapolation of the plant object curve is carried out, the plant object curve being ascertained based on the distances between the radar sensor and the plant objects, and
   wherein ground objects are areas of a ground of a crop area visible to the radar sensor, and wherein plant objects are radar reflections assigned to the field crops in the crop area.

2. The method as recited in claim 1, wherein the plant object curve is extrapolated to a range which corresponds to a relative speed of zero between the plant objects and the radar sensor.

3. The method as recited in claim 1, wherein the categorization of reflection object as plant objects or ground objects takes place using training data.

4. The method as recited in claim 1, wherein the radar sensor is situated on an agricultural machine above a maximum plant height.

5. An apparatus to ascertain a plant height of field crops, a device configured to perform the following:
   ascertaining, using a plant object curve, the plant height using a signal of a radar sensor;
   wherein the ascertainment of the plant height includes categorizing reflection objects as plant objects or ground objects,
   wherein a distance between the radar sensor and the reflection objects and a relative speed between the reflection objects and the radar sensor are ascertained to categorize the reflection objects,
   wherein the plant height is ascertained in that an extrapolation of the plant object curve is carried out, the plant object curve being ascertained based on the distances between the radar sensor and the plant objects, and
   wherein ground objects are areas of a ground of a crop area visible to the radar sensor, and wherein plant objects are radar reflections assigned to the field crops in the crop area.

6. A non-transitory memory medium, on which is stored a computer program, which is executable by a processor, comprising:
   a program code arrangement having program code for ascertaining a plant height of field crops, performing the following:
   ascertaining, using a plant object curve, the plant height using a signal of a radar sensor;
   wherein the ascertainment of the plant height includes categorizing reflection objects as plant objects or ground objects,
   wherein a distance between the radar sensor and the reflection objects and a relative speed between the reflection objects and the radar sensor are ascertained to categorize the reflection objects,
   wherein the plant height is ascertained in that an extrapolation of the plant object curve is carried out, the plant object curve being ascertained based on the distances between the radar sensor and the plant objects, and
   wherein ground objects are areas of a ground of a crop area visible to the radar sensor, and wherein plant objects are radar reflections assigned to the field crops in the crop area.

\* \* \* \* \*